Apr. 17, 1923.

C. G. MERCER 1,452,430

AUTOMOBILE LICENSE BOX

Filed June 5, 1922

WITNESSES

INVENTOR
Charles G. Mercer
BY
ATTORNEYS

Apr. 17, 1923.
C. G. MERCER
1,452,430
AUTOMOBILE LICENSE BOX
Filed June 5, 1922
2 Sheets—Sheet 2
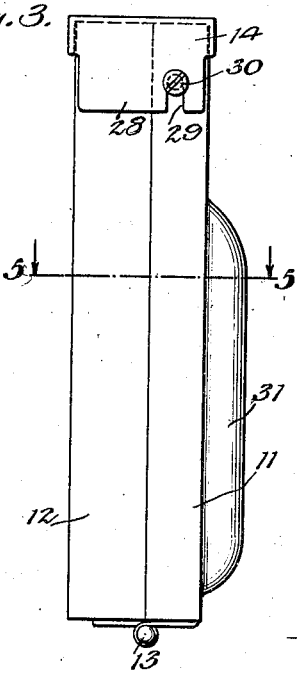
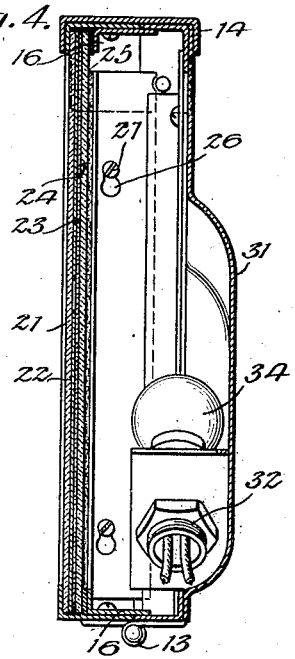
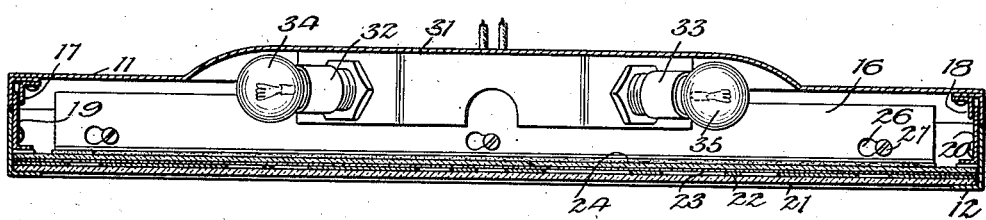
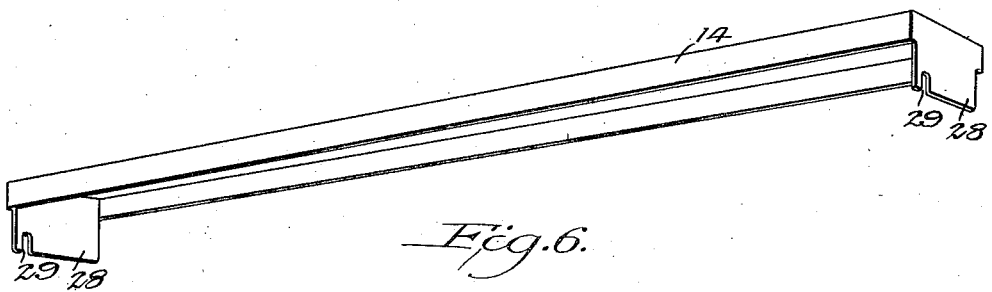
WITNESSES
INVENTOR
Charles G. Mercer
BY
ATTORNEYS Patented Apr. 17, 1923.

1,452,430

UNITED STATES PATENT OFFICE.

CHARLES G. MERCER, OF NEW YORK, N. Y.

AUTOMOBILE LICENSE BOX.

Application filed June 5, 1922. Serial No. 566,052.

*To all whom it may concern:*

Be it known that I, CHARLES G. MERCER, a citizen of the United States, and a resident of the city of New York, borough of Manhattan, in the county and State of New York, have invented a new and Improved Automobile License Box, of which the following is a full, clear, and exact description.

This invention relates to automobile license boxes and lights therefor and has for an object to provide a construction which may be plainly seen day and night.

Another object of the invention is to provide an improved arrangement whereby the numbers on a license box will stand out very distinct.

A still further object is to provide a license box and illumination therefor constructed in an extremely simple manner with the parts hinged together so that access may be readily had at any time.

In the accompanying drawings—

Figure 3 is an end view of the box shown in Figure 1.

Figure 4 is a transverse sectional view through the box shown in Figure 3.

Figure 5 is a horizontal sectional view through the box shown in Figure 3, the same being taken approximately on line 5—5.

Figure 6 is a perspective view of the retaining cap shown in Figures 3 and 4.

Figure 1:
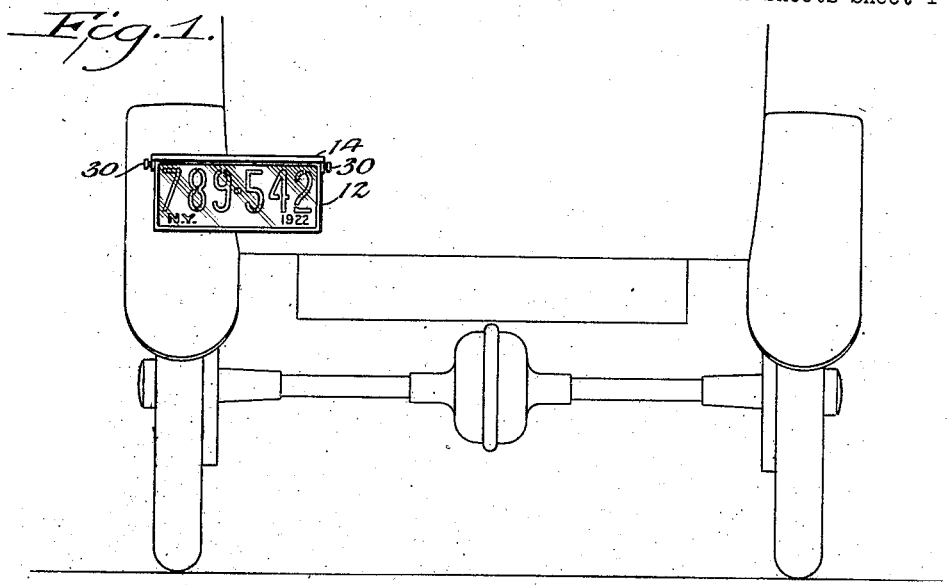
Figure 1 is a rear view of an automobile with a license plate or box embodying the invention shown mounted thereon.
Figure 2:
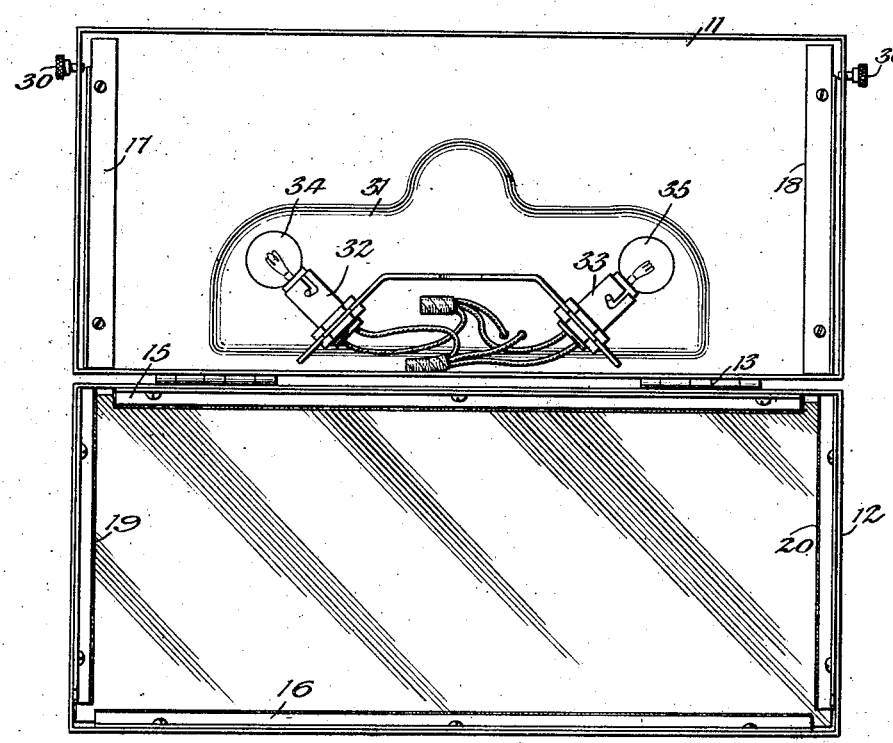
Figure 2 is an elevation on an enlarged scale of the interior of the box shown in Figure 1, the box being shown wide open.

Referring to the accompanying drawings by numeral 11 indicates what may be termed the body of the box and 12 the front which is connected with the body 11 by suitable hinges 13 and by a retaining cap 14. It will be noted that the front 12 is provided with angle bars 15 and 16 which overlap the juncture of the front and body as shown in Figure 4 whereby a substantially water tight joint is produced. The body 11 is provided with angle bars 17 and 18 which overlap the angle bars 19 and 20 of the front 12 so as to produce a substantially water tight joint at the ends. The angle bars 15, 16, 19 and 20 also act as clamping means for clamping certain parts in position. The front 12 is cut out so that it is really a frame and supports a rear plate 21 of clear glass which protects the interior but allows the light to shine through. Next to the clear glass 21 is a plate 22 which plate is in fact a stencil, said plate or stencil being cut out at proper places for disclosing the numbers desired as indicated in Figure 1.

Next to the stencil 22 is a sheet 23 of celluloid preferably colored white and in back of this celluloid sheet is a white or translucent glass plate 24. The various angle bars carried by the frame 12 hold these members in place. Preferably, suitable packing 25 is arranged between the respective angle bars and the plate 24 whereby the various plates may be clamped tightly together without being in danger of breaking. The various angle bars 15, 16, 19 and 20 are preferably provided with openings 26 which openings have a large portion and a restricted portion whereby the heads 27 of the various clamping screws may be readily inserted and the plate shifted longitudinally to a locked position. By this construction and arrangement the plates may be easily removed and easily applied. In order to hold the front 12 against the body 11 at the top, the retaining cap 14 is provided which cap is substantially U-shape in cross section and which is provided with depending ends 28, each end having a notch 29 for accommodating the respective clamping screws 30. When the retaining cap 14 is in position as shown in Figure 3, the respective screws 30 are tightened whereupon the parts are in position for use and may be mounted in any desired manner on an automobile.

In constructing the body 11, the back portion is formed with a bulged or pressed out section 31 carrying suitable sockets 32 and 33 designed to receive suitable lamps 34 and 35. The sockets 32 and 33 receive current from any suitable source and are designed to cause the lamps 34 and 35 to become lighted for illuminating the interior of the box and to project light through the various plates 21 and 24 inclusive but said light can only be projected through the cut out portions in the plate or stencil 22 which thereby presents correctly formed numbers indicating the license number. The light allowed to project through these numbers must first pass through the translucent plate 24 and the celluloid sheet 23 whereby it is somewhat diffused but will cause the numbers to appear permanently both day and night.

What I claim is:—

1. A license box comprising a closure formed with a body and a front hinged thereto, a plurality of angle bars secured respectively to said body and to said front, said angle bars carried by the front, each having one leg spaced from the front wall of said front and the other leg overlapping the angle bars carried by the body for producing a substantially water-tight structure when the front is closed on the body, and means having cut-out portions indicating numbers carried by the front and clamped in place between said front wall and said legs of the angle bars spaced from said front walls, together with illuminating means arranged interiorly of said body.

2. A license box comprising a body provided with angle plates at the sides spaced a distance from the side walls thereof, a front hingedly secured to said body at the bottom and angle plates secured on the sides of said front adapted to engage between the walls of said body and the angle plates associated therewith to form a water-tight structure, together with means for displaying a written number carried by said front and clamped by said angle plates on said front.

3. An automobile license box comprising a body, a front hinged to the body at the lower part of the box, a removable substantially U shaped cap formed at its ends with downwardly extending flanges each presenting a slot, said cap being adapted to lock together said body and front, means on the ends of said body to receive said slots and positively hold said cap in place, lamps arranged in said body, and a slide perforated to form legends representing the license number of the automobile carried by said front and illuminated by said lamps.

4. An automobile license box comprising a body and a front hinged thereto, said front being in the form of a frame and carrying a plate perforated to present numbers or letters, a translucent member at one side of said plate, a transparent member at the other side of said plate, illuminating means in said body, and a cap for said body and front formed with flanges at all sides, certain of said flanges being each provided with a slot adapted to be engaged by said clamping means on the body to securely hold said cap in position.

CHARLES G. MERCER.